United States Patent
Li et al.

(10) Patent No.: US 7,097,752 B2
(45) Date of Patent: Aug. 29, 2006

(54) EDI DEVICE WITH RESIN SEEPAGE-PROOF INSERTS

(75) Inventors: Xiang Li, Huzhou Zhejiang (CN); Gou-Lin Luo, Houzhou Zhejiang (CN)

(73) Assignee: Zhejiang Omex Environmental Engineering, Ltd., Huzhou (CN)

( * ) Notice: Subject to any disclaimer, the term of this patent is extended or adjusted under 35 U.S.C. 154(b) by 375 days.

(21) Appl. No.: 10/630,337

(22) Filed: Jul. 30, 2003

(65) Prior Publication Data

US 2004/0112752 A1 Jun. 17, 2004

Related U.S. Application Data

(60) Provisional application No. 60/445,490, filed on Feb. 6, 2003.

(30) Foreign Application Priority Data

Jul. 30, 2002 (CN) ................ 02 2 65983

(51) Int. Cl.
*B01D 61/48* (2006.01)
(52) U.S. Cl. ............... 204/632; 204/633; 204/660
(58) Field of Classification Search ........... 204/627, 204/632, 633, 660
See application file for complete search history.

(56) References Cited

U.S. PATENT DOCUMENTS

| | | | |
|---|---|---|---|
| 2,689,826 A | 9/1954 | Kollsman | |
| 2,815,320 A | 12/1957 | Kollsman | |
| 4,225,413 A | 9/1980 | Karn | |
| 4,601,808 A * | 7/1986 | Eumann et al. | 204/632 |
| 4,753,681 A | 6/1988 | Giuffrida et al. | |
| 4,925,541 A | 5/1990 | Giuffrida et al. | |
| 4,931,160 A | 6/1990 | Giuffrida | |
| 5,147,722 A | 9/1992 | Koslow | |
| 5,259,936 A | 11/1993 | Ganzi | |

(Continued)

FOREIGN PATENT DOCUMENTS

EP 0 384 716 A2 8/1990

(Continued)

OTHER PUBLICATIONS

How the Omexell 210 Module Works—2 pgs.

(Continued)

*Primary Examiner*—Roy King
*Assistant Examiner*—William T. Leader
(74) *Attorney, Agent, or Firm*—Butzel Long

(57) ABSTRACT

The resin seepage-proof spiral would Electrodeionization (EDI) module includes anion and cation ion exchange membranes, concentrate and dilute distributing channels, net sheets inside of the channels, positive and negative electrodes and an EDI housing. The housing includes an insulation shell and covers. The multiple layers of anion and cation ion exchange membranes concentrate and dilute water distributing channels and net sheets are wound around a negative electrode pipe centered in the EDI module. The negative electrode pipe is arranged to collect concentrate water inside of the pipe. A circularity positive electrode is located outside the wound membranes and within the insulation shell, which is generally cylindrical in shape. Inside the cylindrical housing, the dilute water distributing channel is filled by ion exchange resin. The EDI module includes two inserts of multiple holed material layer, one on each end of the module. Each insert is covered and fixed by a filter cover plate having multi-holes to allow water through. The inserts are arranged to allow water to flow through, and to impede resin from flowing through. These advantages keep the EDI module resin seepage-proof and provide beneficially high performance of water distributing and collection by the module.

14 Claims, 2 Drawing Sheets

U.S. PATENT DOCUMENTS

| | | |
|---|---|---|
| 5,292,422 A | 3/1994 | Liang et al. |
| 5,308,466 A | 5/1994 | Ganzi et al. |
| 5,316,637 A | 5/1994 | Ganzi et al. |
| 5,376,253 A | 12/1994 | Rychen et al. |
| 5,425,858 A | 6/1995 | Farmer |
| 5,858,191 A | 1/1999 | DiMascio et al. |
| 5,868,915 A | 2/1999 | Ganzi et al. |
| 5,925,255 A | 7/1999 | Mukhopadhyay |
| 5,954,937 A | 9/1999 | Farmer |
| 6,190,528 B1 | 2/2001 | Li et al. |
| 6,193,869 B1 | 2/2001 | Towe et al. |
| 6,284,117 B1 | 9/2001 | Smolko et al. |
| 6,284,124 B1 | 9/2001 | DiMascio et al. |
| 6,309,532 B1 | 10/2001 | Tran et al. |
| 6,312,577 B1 | 11/2001 | Ganzi et al. |
| 6,328,896 B1 | 12/2001 | Atnoor et al. |
| 6,398,965 B1 | 6/2002 | Arba et al. |
| 6,436,264 B1 | 8/2002 | Tamura |
| 2002/0011413 A1 | 1/2002 | DiMascio et al. |

FOREIGN PATENT DOCUMENTS

| | | |
|---|---|---|
| EP | 0 660 747 B1 | 7/1995 |
| EP | 0 892 677 B1 | 1/1999 |
| WO | WO 94/06548 | 3/1994 |
| WO | WO 95/32803 | 12/1995 |
| WO | WO 97/28889 | 8/1997 |
| WO | WO 98/11987 | 3/1998 |
| WO | WO 98/20972 | 5/1998 |
| WO | WO 99/50184 | 10/1999 |
| WO | WO 00/44477 | 8/2000 |
| WO | WO 02/14224 A1 | 2/2002 |

OTHER PUBLICATIONS

The New Leader in EDI—Omexell 210 Module—2 pgs.
The New Leader in EDI—Omexell System—2 pgs.
An Introduction to Spiral Wound EDI, Water Technology—4 pgs. (Jan. 2003).

* cited by examiner

EDI DEVICE WITH RESIN SEEPAGE-PROOF INSERTS

This application is a non-provisional application of U.S. provisional application No. 60/445,490 filed on Feb. 6, 2003.

FIELD OF THE INVENTION

This invention relates to an Electrodeionization (EDI) water producing device, and in particular, to an approach for inhibiting resin seepage in an EDI device or module.

BACKGROUND OF THE INVENTION

Water treatment equipment is broadly used in many industry fields. Traditional water treatment processes treat water by desalting source water. Typically, desalted equipment combines ion-exchange technology and electrodialysis technology. For example, Chinese Patent No. 96244875.4 shows an EDI device which combines ion-exchange technology and electrodialysis technology. In Chinese Patent No. 96244875.4, anion and cation resin is placed inside a dilute water chamber of the electrodialysis device and positive and negative electrodes are placed outside the device.

Chinese Patent No. 00220610.2 shows a multi-surface volume EDI module which consists of positive and negative electrodes, membrane bags and a frame. The anion and cation ion exchange membranes are combined with isolation net sheets to form membrane bags which fold to include concentrate water channels and dilute water channels. Each of the concentrate water channels and the dilute water channel connects to a different individual water collection chamber extending from a dilute/concentrate collection pipe. The dilute water channels are filled with ion-exchange resins, and consist of linked together rectangle channels.

Traditional EDI modules use net sheet as the material for resin water distributing and water collection. This material can cause the problems of resin seepage and loss. Moreover, the known materials can block the channels that are used for feed water. U.S. Pat. No. 6,190,528, issued Feb. 20, 2001 to Xiang Li et al. discloses a helical EDI apparatus having the resin seepage disadvantages described above. U.S. Pat. No. 6,190,528 is incorporated herein by reference in its entirety.

SUMMARY OF THE INVENTION

In accordance with the preferred embodiments of the invention, a new EDI module includes material having multiple holes for resin water distributing and water collection. In accordance with a preferred embodiment, an electrodeionization (EDI) device includes an anion exchange membrane, a cation exchange membrane, a first electrode, at least one membrane bag formed by the anion exchange membrane and the cation exchange membrane, and a second electrode. The membrane bag also includes a concentrate flow channel. A dilute flow channel is located adjacent to the at least one membrane bag. The at least one membrane bag and dilute flow channel form an inner module having a first end and a second end opposite the first end. A first insert of filter material is arranged at the first end of the inner module, while a second insert of filter material is arranged at the second end of the inner module. The first and second inserts of filter material are arranged to allow water to flow through while inhibiting resin from flowing through. A housing contains the foregoing components.

In another preferred embodiment, a first filter plate is located adjacent the first insert of filter material opposite the inner module and is arranged to fix the first insert of filter material against the inner module. In addition, a second filter plate is located adjacent the second insert of filter material opposite the inner module and is arranged to fix the second insert of filter material against the inner module. The first and second filter plates have apertures through the plates for allowing water to pass through the plates.

In yet another preferred embodiment, the first and second inserts of filter material include layers of material formed from an alkene polymer with microscopic channels of even distribution throughout the layers. Preferably the first and second inserts of filter material are wheel shaped having a central aperture arranged to fit around the axially extending conduit and within the housing.

Further scope of applicability of the present invention will become apparent from the description given hereinafter. However, it should be understood that the detailed description and specific examples, while indicating preferred embodiments of the invention, are given by way of illustration only, since the invention will become apparent to those skilled in the art from this detailed description.

BRIEF DESCRIPTION OF THE DRAWINGS

The invention will be described in conjunction with the following drawings in which like referenced numerals designate like elements and wherein.

DETAILED DESCRIPTION OF THE INVENTION

The preferred EDI device or module is a spiral wound module having material with multiple holes that solve the problems of resin seepage and feed water blockage. In accordance with a preferred embodiment, the EDI module includes anion and cation ion exchange membranes, concentrate and dilute water distributing channels, net sheets inside the channels, positive and negative electrodes and an EDI housing. The module is preferably cylindrical in shape, and is preferably rolled up by above-mentioned multiple layers of anion and cation ion exchange membranes. Concentrate and dilute water distributing channels include net sheets therein. The net sheets inside the channels extend along the center of a generally axially located pipe in which concentrate water is collected. The pipe preferably also includes a negative electrode.

The support frame is described in combination with an EDI device that is spiral wound or helical. It is understood that the support frame can also be used with other types of EDI devices, including stacked EDI devices. Accordingly, the scope of the invention is not limited to spiral wound EDI devices, but includes various other types of EDI devices, as readily understood by a skilled artisan.

While not being limited to a particular theory, outside the membranes there is a circular positive electrode within an insulation shell. Inside the housing, the dilute water channel is filled by ion exchange resin. Both ends of the housing include an insert of multiple holed material layers which are preferably covered and secured in position by a filter plate having multi-holes for fluid flow through.

While not being limited to a particular theory, in the next preferred embodiment, the multiple holed material layers are most preferably made from alkene high polymer materials in which the hollow molecule channels cross together to make small channels having a layout that filters out resin and permits water to flow through. The multiple holed material layers fit about the center negative electrode pipe in which concentration water is collected inside. The material layers are preferably fixed by holed filter plates on both ends of the cylinder.

The preferred EDI module can be efficiently constructed with suitable materials. The multiple holed material layers provide the benefit of allowing water distributing and collection, while keeping the resin seepage-proof for high performance of water distributing and collection. That is, the multiple holed material is a filter that allows water through, but inhibits resin flow. Preferably, the multiple holed material layers are made from alkene high polymer through sintering, extruding, melting, frothing or felting. However, it is within the scope of the invention to use another material that provides the same benefits.

Figure 1:
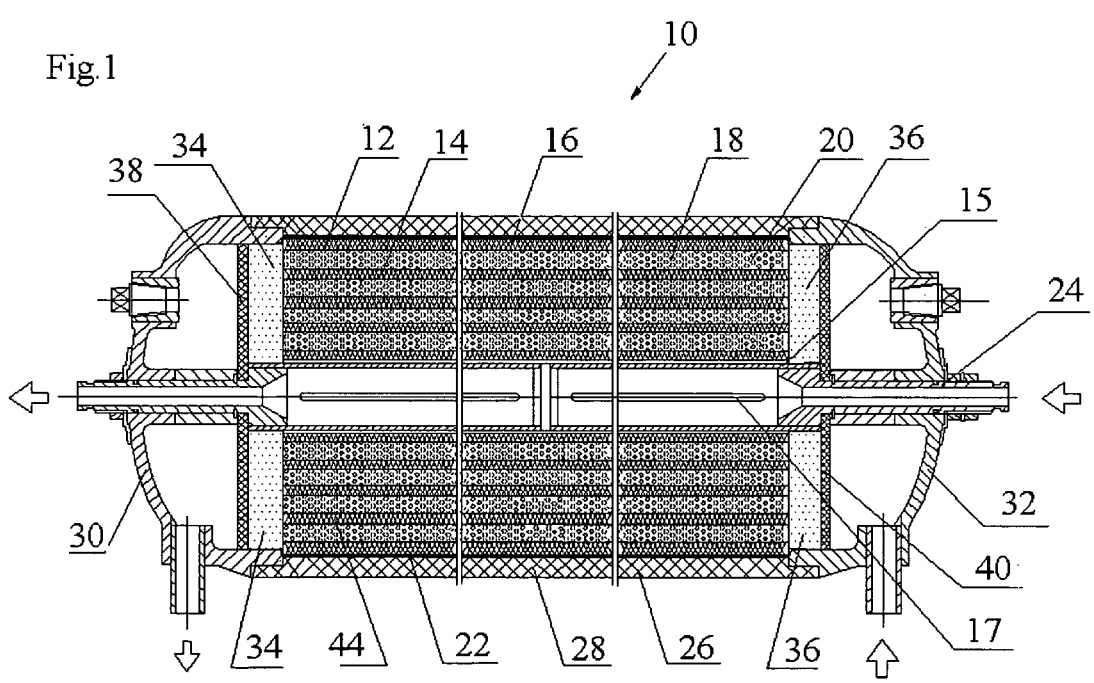
FIG. 1 is a side view of an Electrodeionization module in accordance with a preferred embodiment of the invention.
Figure 2:
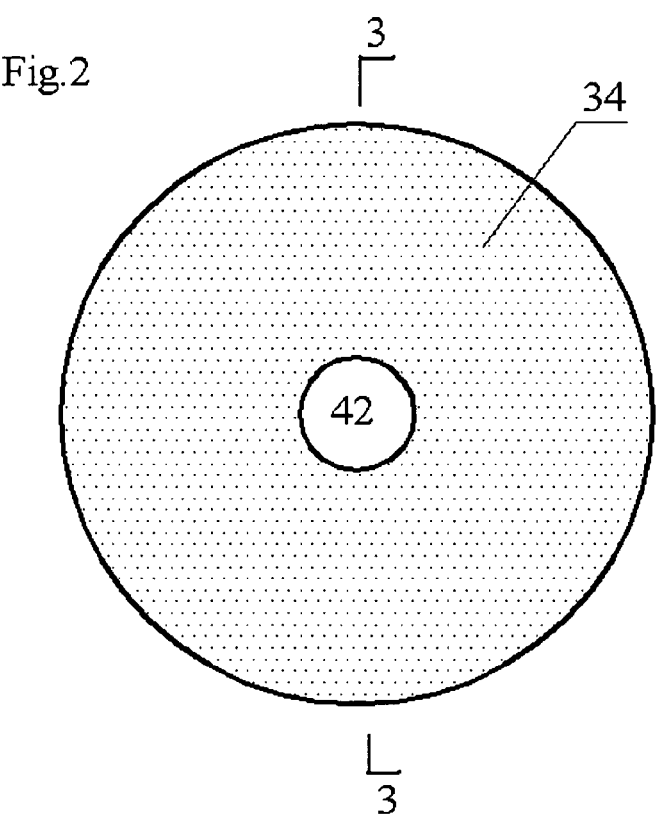
FIG. 2 is a side view of an insert of multiple holed layers of cylindrical material layers in accordance with the preferred embodiment of the invention.
Figure 3:
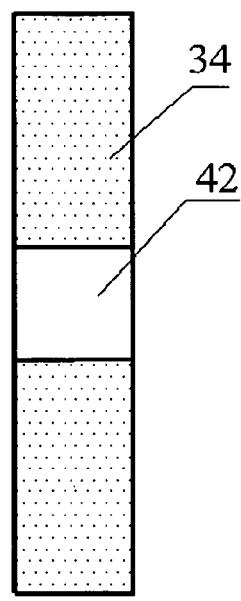
FIG. 3 is a sectional view of the multiple holed material layer insert along line 3—3 of FIG. 2.

The present invention is directed to a device and technique for blocking resin while permitting water to flow in a spiral wound EDI module. An exemplary resin seepage-proof spiral wound EDI module 10 is shown in FIG. 1. As shown, the resin seepage-proof spiral wound EDI module 10 includes anion and cation ion exchange membranes 12, 14, a water collection pipe 15 having slots 17 for fluid access to concentrate and dilute distributing channels 16, 18, net sheets 20 inside of the channels 16, 18, a positive electrode 22, a negative electrode 24 and an EDI housing 26. The housing 26 includes an insulation shell 28 and two end covers 30, 32, with one end cover on each side of the insulation shell 28. The anion and cation ion exchange membranes are rolled up into multiple membrane layers in cylinder form.

The anion and cation membranes are partially sealed to form a membrane bag 44, with an unsealed portion of the bag attached to the water collection pipe 15 along the axial direction of the pipe. The attached unsealed portion is adapted to fit around a respective slot of the water collection pipe to allow concentrate water to flow from the pipe into the membrane bag and back through another slot in the pipe into the pipe. The concentrate water is then flushed from the EDI module 10 out of the pipe 15. If the concentrate water enters the membrane bag 44 via an entry other than the slot 17 in the pipe 15, then the water collection pipe 15 may be arranged simply to receive the concentrate water from the membrane bag 44. The water collection pipe 15 is thereby considered to be a water distributing or gathering member.

While not being limited to a particular theory, the water collection pipe 15 is an axially extending conduit centrally located along the axis of the EDI module 10, and is connected to a cathode to become the negative electrode 24. Concentrate water is collected inside the negative electrode conduit and flows through slots in the pipe 15 into net sheets 20 inside of the concentrate and dilute distributing channels 16, 18 formed by the membrane bag 44. The net sheets 20 form a net separating wall inside the membrane bag 44 insulating the concentrate water from the anion and cation exchange membranes 12, 14. Outside the membranes 12, 14 is a circularity positive electrode 22 connected to an anode and located within the insulation shell 28. Inside the cylindrical EDI housing 26, the dilute distributing channel 18 is filled by ion exchange resin. On both ends of the rolled up membranes 12, 14 are like sized inserts 34, 36 of resin seepage or leak-proof material in layers, the material having a plurality of small holes. Each insert 34, 36 of multiple holed material is covered and fixed by a respective filter plate 38,40 having multiple holes for allowing liquid through. Each filter plate 38, 40 is sealed and covered by a respective end cover 30, 32 of the EDI module.

While not being limited to a particular theory, the multiple holed material is preferably made from high alkene polymer and all molecule or microscopic hollow channels cross together to make holes of even distribution throughout the layers. Other materials that allow water flow and block resin flow are considered to be within the scope of the invention.

The inserts of multiple holed material layers 34, 36 include a center aperture 42 arranged to fit around the water collection pipe 15. The inserts are fixed on both ends of the EDI module 10 by filter plates 38, 40.

It should be apparent from the aforementioned description and attached drawings that the concept of the present invention may be readily applied to a variety of preferred embodiments, including those disclosed herein. For example, as previously noted, while the support frame is described in accordance with a preferred embodiment for a helical EDI device, it is understood that the frame is applicable to other types of EDI devices, including stacked EDI devices, in accordance with other preferred embodiments. Without further elaboration, the foregoing will so fully illustrate the invention that others may, by applying current or future knowledge, readily adapt the same for use under various conditions of service.

What is claimed is:

1. An electrodeionization device comprising:
   an anion exchange membrane;
   a cation exchange membrane;
   a first electrode;
   at least one membrane bag formed by the anion exchange membrane and the cation exchange membrane;
   an axially extending conduit
   a second electrode;
   said at least one membrane bag having a concentrate flow channel;
   a dilute flow channel located adjacent said at least one membrane bag, said at least one membrane bag and said dilute flow channel forming an inner module having a first end and a second end opposite the first end;
   a first insert of filter material arranged at the first end of said inner module;
   a second insert of filter material arranged at the second end of said inner module,
   said first and second inserts of said filter material including layers of material formed from an alkene polymer having microscopic channels evenly distributed thoughout the layers,
   said first and second inserts of filter material arranged to allow water to flow through while inhibiting resin from flowing through; and a housing for the foregoing components.

2. The device of claim 1, further comprising a first filter plate adjacent said first insert of filter material opposite said inner module, said first filter plate having apertures through the plate for allowing water to pass therethrough and being arranged to fix said first insert of filter material against said inner module.

3. The device of claim 2, further comprising a second filter plate adjacent said second insert of filter material opposite said inner module, said second filter plate having apertures through the plate for allowing water to pass therethrough and being arranged to fix said second insert of filter material against said inner module.

4. The device of claim 1, wherein said second electrode comprises a metal strip or metal wire forming a conductive crust.

5. The device of claim 1, wherein said first electrode is said axially extending conduit.

6. The device of claim 5, wherein said axially extending conduit is a metal pipe centrally extending within said housing.

7. The device of claim 1, wherein the first and second inserts of filter material are wheel shaped having a central aperture arranged to fit around said axially extending conduit and within said housing.

8. The device of claim 1, further comprising a cathode linked with said first electrode and an anode linked with said second electrode.

9. The device of claim 1, wherein said at least one membrane bag comprises at least one set of membrane bags formed by positioning an interface between the anion exchange membrane and the cation exchange membrane.

10. The device of claim 1, wherein the electrodeionization device is spiral wound to form a helical electrodeionization device, and further comprising an axially extending conduit generally located along a central axis of the helical electrodeionization device.

11. The device of claim 10, wherein said at least one membrane bag and said dilute flow channel are wound about said axially extending conduit, and said dilute flow channel is positioned between wound layers of said a least one wound membrane bag.

12. The device of claim 10, wherein said second electrode is a metal member extending about the outside of said inner module.

13. The device of claim 10, wherein said axially extending conduit is a pipe having slotted apertures arranged to communicate fluid with said concentrate flow channel.

14. The device of claim 10, wherein said axially extending conduit includes said first electrode.

* * * * *